(12) United States Patent
Takeda et al.

(10) Patent No.: US 12,095,547 B2
(45) Date of Patent: Sep. 17, 2024

(54) BASE STATION AND SYNCHRONIZATION SIGNAL TRANSMISSION METHOD

(71) Applicant: NTT DOCOMO, INC., Tokyo (JP)

(72) Inventors: Daiki Takeda, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/482,660

(22) PCT Filed: Jan. 22, 2018

(86) PCT No.: PCT/JP2018/001739
§ 371 (c)(1),
(2) Date: Jul. 31, 2019

(87) PCT Pub. No.: WO2018/142978
PCT Pub. Date: Aug. 9, 2018

(65) Prior Publication Data
US 2019/0349108 A1 Nov. 14, 2019

(30) Foreign Application Priority Data
Feb. 3, 2017 (JP) .................... 2017-019141

(51) Int. Cl.
*H04J 11/00* (2006.01)
*H04W 56/00* (2009.01)
*H04W 88/08* (2009.01)

(52) U.S. Cl.
CPC ....... *H04J 11/0073* (2013.01); *H04J 11/0076* (2013.01); *H04J 11/0079* (2013.01);
(Continued)

(58) Field of Classification Search
CPC ............. H04J 11/0073; H04J 11/0076; H04J 11/0079; H04J 11/0089; H04W 56/001; H04W 88/085; H04W 56/00; H04W 72/04
See application file for complete search history.

(56) References Cited

U.S. PATENT DOCUMENTS 11,678,206 B2 * 6/2023 Harada ................. H04W 24/02
370/252
2010/0041350 A1 * 2/2010 Zhang ................... H04L 5/0044
375/267
(Continued)

FOREIGN PATENT DOCUMENTS

WO    WO 2018082768 A1 * 11/2016 ............. H04L 27/26

OTHER PUBLICATIONS

International Search Report issued in PCT/JP2018/001739 mailed on Apr. 10, 2018 (3 pages).
(Continued)

*Primary Examiner* — Ajit Patel
*Assistant Examiner* — Wilfred Thomas
(74) *Attorney, Agent, or Firm* — Osha Bergman Watanabe & Burton LLP

(57) ABSTRACT

In one aspect of the present invention, a base station includes an index generation unit configured to generate an index indicating a time-domain location of a synchronization signal block where a synchronization signal or a physical broadcast channel is placed; and a transmission unit configured to transmit a portion of the index using one or more synchronization signal of a primary synchronization signal, a secondary synchronization signal, and a tertiary synchronization signal and transmit a remaining portion of the index using the physical broadcast channel.

8 Claims, 15 Drawing Sheets

(52) U.S. Cl.
CPC ....... *H04J 11/0089* (2013.01); *H04W 56/001* (2013.01); *H04W 88/085* (2013.01)

(56) References Cited

U.S. PATENT DOCUMENTS

| | | | | |
|---|---|---|---|---|
| 2010/0260112 | A1* | 10/2010 | Ramesh | H04W 68/025 370/328 |
| 2013/0039268 | A1* | 2/2013 | Blankenship | H04W 56/0015 370/328 |
| 2014/0301330 | A1* | 10/2014 | Lee | H04W 74/0833 370/329 |
| 2015/0016339 | A1* | 1/2015 | You | H04W 56/001 370/328 |
| 2015/0327226 | A1* | 11/2015 | Cheng | H04W 72/042 370/329 |
| 2016/0135179 | A1* | 5/2016 | Yin | H04J 11/0069 370/329 |
| 2016/0294528 | A1* | 10/2016 | Kim | H04L 5/0053 |
| 2017/0111886 | A1* | 4/2017 | Kim | H04W 72/042 |
| 2017/0279553 | A1* | 9/2017 | Sadiq | H04L 27/261 |
| 2018/0014218 | A1* | 1/2018 | Kubota | H04W 48/00 |
| 2018/0176065 | A1* | 6/2018 | Deng | H04W 56/001 |
| 2018/0234931 | A1* | 8/2018 | Ly | H04L 5/0051 |
| 2018/0241525 | A1* | 8/2018 | Ouchi | H04L 5/0053 |
| 2018/0324023 | A1* | 11/2018 | Zeng | H04L 25/022 |
| 2019/0288899 | A1* | 9/2019 | Wang | H04L 27/2666 |
| 2019/0327123 | A1* | 10/2019 | Wang | H04W 56/00 |
| 2019/0349108 | A1* | 11/2019 | Takeda | H04J 11/0073 |
| 2019/0364522 | A1* | 11/2019 | Akkarakaran | H04L 5/0048 |
| 2019/0372645 | A1* | 12/2019 | Xiong | H04J 11/0079 |
| 2019/0373602 | A1* | 12/2019 | Qin | H04W 72/04 |
| 2020/0120488 | A1* | 4/2020 | Liu | H04L 5/00 |
| 2020/0163037 | A1* | 5/2020 | Zheng | H04W 16/14 |
| 2020/0169980 | A1* | 5/2020 | Du | H04L 27/2605 |
| 2020/0204423 | A1* | 6/2020 | Atungsiri | H04B 7/0695 |
| 2020/0275451 | A1* | 8/2020 | Liu | H04W 72/005 |
| 2020/0382265 | A1* | 12/2020 | Fukui | H04L 1/08 |
| 2020/0404685 | A1* | 12/2020 | Lin | H04L 5/0098 |

OTHER PUBLICATIONS

Written Opinion of the International Searching Authority issued in PCT/JP2018/001739 mailed on Apr. 10, 2018 (3 pages).
3GPP TS 36.212 V14.1.1; "3rd Generation Partnership Project; Technical Specification Group Radio Access Network; Evolved Universal Terrestrial Radio Access (E-UTRA); Multiplexing and channel coding (Release 14)"; Jan. 2017 (149 pages).
Office Action issued in the counterpart Japanese Patent Application No. 2018-566057, mailed on Apr. 14, 2020 (5 pages).
Huawei et al.; "WF on SS-block Index Indication"; 3GPP TSG RAN WG1 NR Ad Hoc Meeting, R1-1701530; Spokane, USA; Jan. 16-20, 2017 (3 pages).
Huawei, HiSilicon; "Discussion and evaluation on NR-SS multiplexing and bandwidth"; 3GPP TSG RAN WG1 NR Ad Hoc Meeting, R1-1700033; Spokane, USA; Jan. 16-20, 2017 (12 pages).
Extended European Search Report issued in Application No. 18747298.0, mailed on Nov. 27, 2020 (7 pages).
3GPP TSG RAN WG1 NR AH; R1-1700884; "SS BW and multiplexing;" Samsung; Jan. 16-20, 2017; Spokane, USA (8 pages).
3GPP TSG-RAN WG1 NR AdHoc; R1-1700788; "PBCH design considerations;" Qualcomm Incorporated; Jan. 16-20, 2017; Spokane, USA (6 pages).
Office Action issued in Indonesia Application No. P00201907540 mailed on Sep. 18, 2021 (10 pages).
Office Action issued in Indian Application No. 201937030365 mailed on Jan. 11, 2022 (6 pages).
Office Action issued in Chinese Application No. 201880009196.7; Dated Sep. 22, 2022 (14 pages).

* cited by examiner

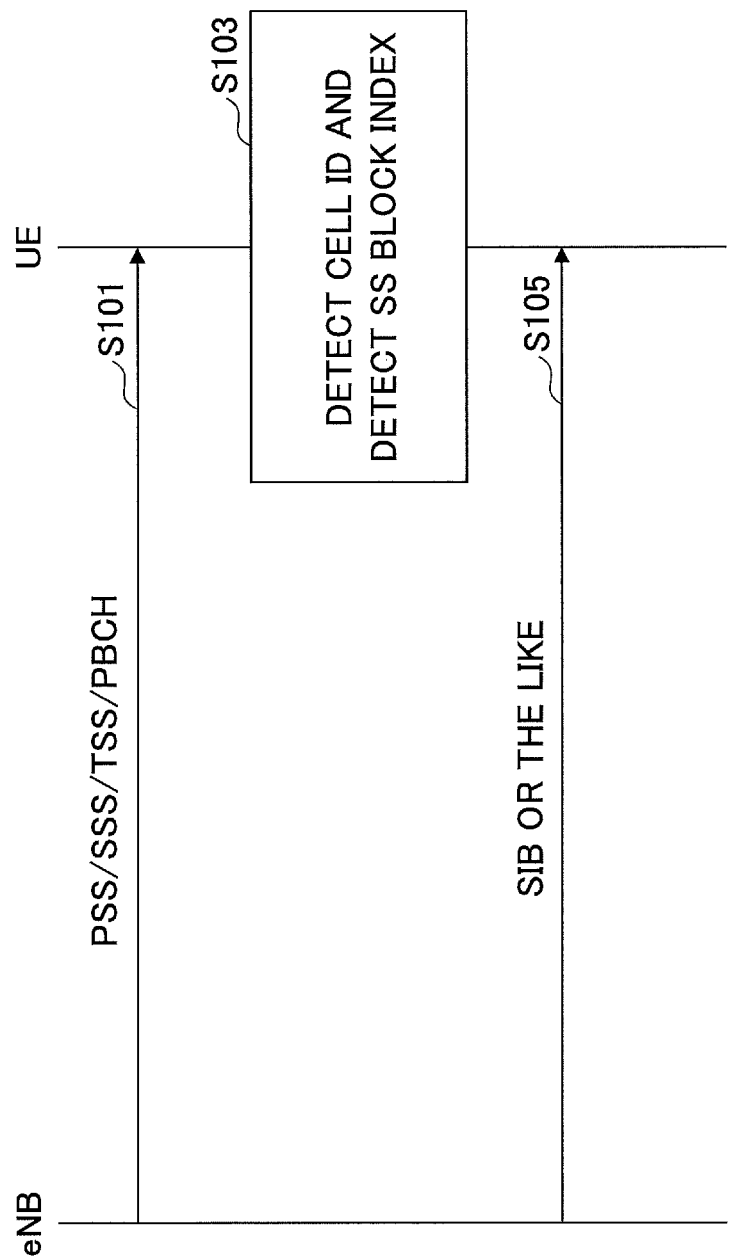

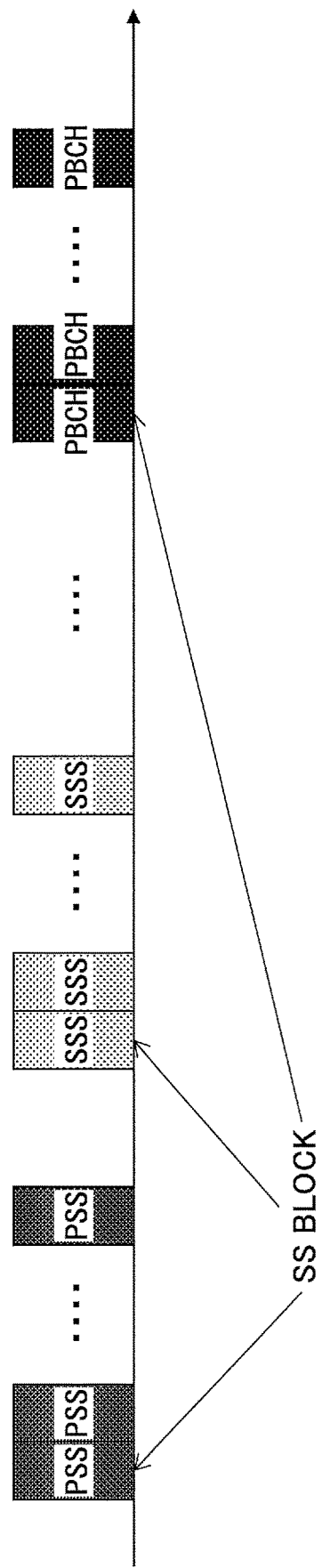

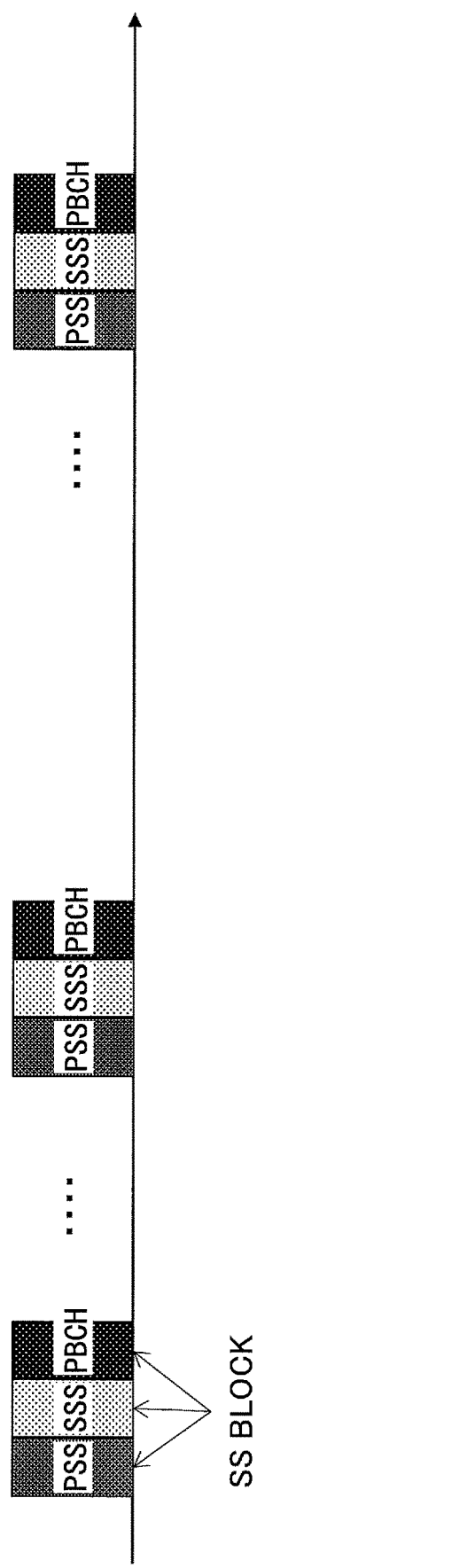

FIG.5C

| EXEMPLARY PROVISIONING SCHEME NO. | PROVISIONING SCHEME OF SS BLOCK INDEX |
|---|---|
| 1-1 | SSS+PBCH |
| 1-2 | PSS+PBCH |
| 1-3 | PSS+SSS+PBCH |

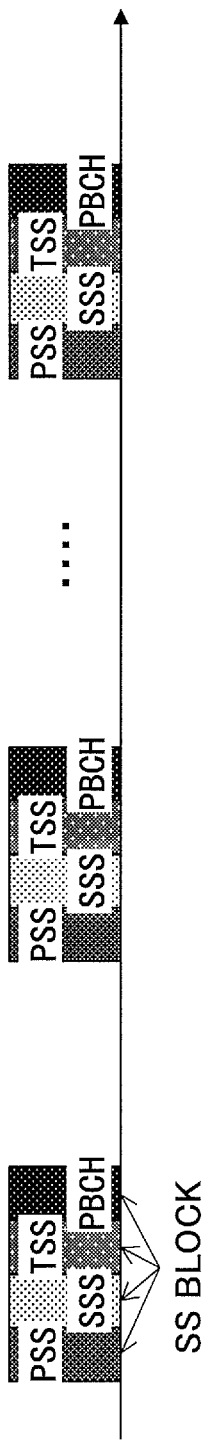

SS BLOCK

SS BLOCK

SS BLOCK

FIG.6F

| EXEMPLARY PROVISIONING SCHEME NO. | PROVISIONING SCHEME OF SS BLOCK INDEX |
|---|---|
| 2-1 | TSS+PBCH |
| 2-2 | PSS+TSS+PBCH |
| 2-3 | SSS+TSS+PBCH |
| 2-4 | PSS+SSS+TSS+PBCH |

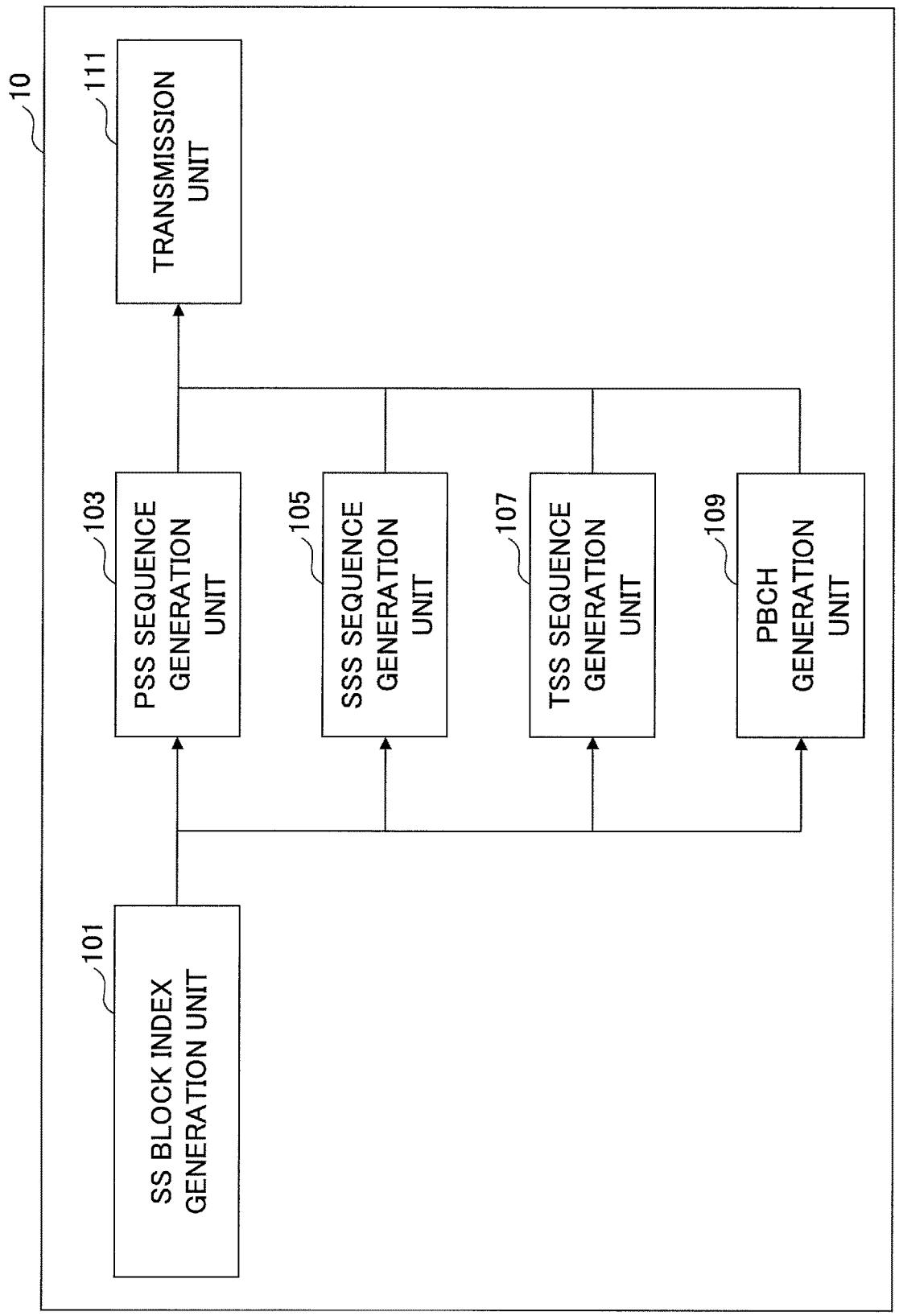

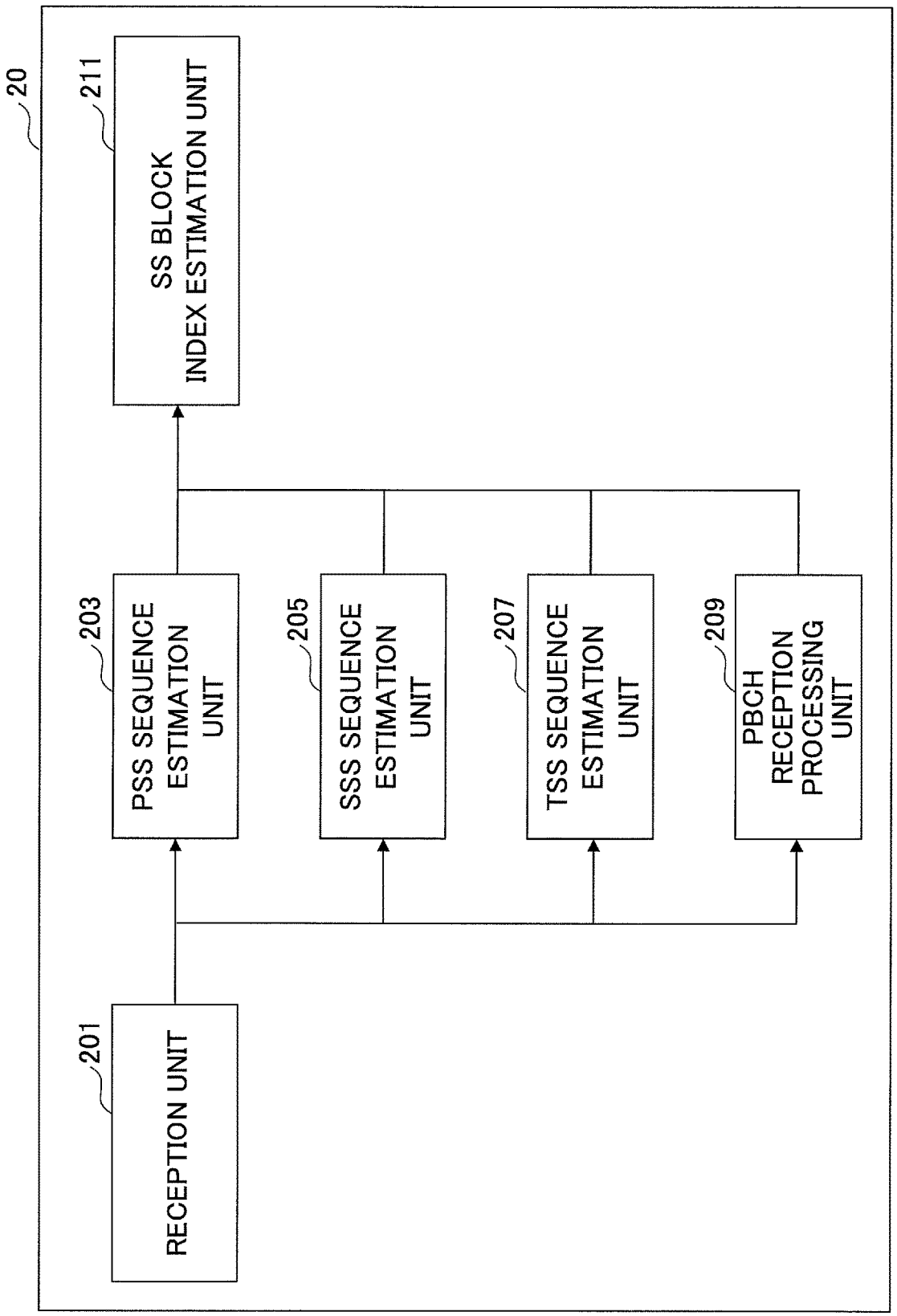

BASE STATION AND SYNCHRONIZATION SIGNAL TRANSMISSION METHOD

TECHNICAL FIELD

The present invention relates to a base station and a synchronization signal transmission method.

BACKGROUND ART

As initial access to a carrier provided by a base station (eNB: enhanced Node B) in Long Term Evolution (LTE), a user equipment apparatus (UE: user equipment) detects synchronization signals (SSs) referred to as a primary synchronization signal (PSS) and a secondary synchronization signal (SSS), and then demodulates a physical broadcast channel (PBCH).

FIG. 1 is a diagram illustrating a frame structure for initial access in LTE. In LTE, two sets of PSSs and SSSs are multiplexed into a radio frame of 10 ms, and a PBCH is multiplexed together with one of the two sets. The PSS is typically used for synchronization of symbol timing and detection of a local ID. The SSS is typically used for synchronization of the radio frame and detection of a cell group ID. When synchronization is established and a cell ID is identified using the PSS and the SSS, a PBCH of a carrier corresponding to the cell ID can be decoded. The PBCH includes basic information such as a system bandwidth, a system frame number (SFN), and so on. When the PSS, the SSS, and the PBCH are detected, a system information block (SIB) can be subsequently received and a location of a time resource for random access can be obtained (see Non-Patent Document 1).

PRIOR ART DOCUMENT

Non-Patent Document

[Non-Patent Document 1] 3GPP TS 36.212 V14.1.1 (2016 December)

DISCLOSURE OF INVENTION

Problem(s) to be Solved by the Invention

In the 3rd Generation Partnership Project (3GPP), a next-generation system called 5G, which follows LTE and LTE-Advanced, is currently under discussion.

In LTE, a single beam operation, in which a beam direction is fixed during initial access, is supported. In a next-generation system, it is expected that a single beam operation, in which a PSS, an SSS, and a PBCH are repeatedly transmitted in the time domain without changing a beam direction, as well as a multi-beam operation (also referred to as "beam sweeping"), in which a PSS, an SSS, and a PBCH are repeatedly transmitted by changing a beam direction, will be supported. In order for a user equipment apparatus to receive a SIB and obtain a location of a time resource for random access after detecting a PSS, an SSS, and a PBCH, the user equipment apparatus needs to identify, for the PSS, the SSS, and the PBCH that were detected, the number of PSS, SSS, and PBCH that had been transmitted within a repetition period. For this reason, a base station needs to provide to the user equipment apparatus an index (hereinafter referred to as an "SS block index") indicating a time-domain location of a resource (hereinafter referred to as an "SS block") where the PSS, the SSS, and the PBCH are placed.

In LTE, information necessary for SIB reception and random access can be transmitted on a PBCH. In a next-generation system, as the amount of information such as an SFN and the number of cell IDs may increase, providing an SS block index on the PBCH may cause a shortage of a payload size of the PBCH. On the other hand, providing an SS block index using the PSS and the SSS may increase a workload of a user equipment apparatus, because the user equipment apparatus has to detect a combination of a cell ID and the SS block index at one time.

It is an object of the present invention to provide an SS block index to a user equipment apparatus while avoiding a shortage of a payload size of a PBCH and reducing a workload of the user equipment apparatus during initial access.

Means for Solving the Problem(s)

In one aspect of the present invention, there is provision for a base station, including:

an index generation unit configured to generate an index indicating a time-domain location of a synchronization signal block where a synchronization signal or a physical broadcast channel is placed; and a transmission unit configured to transmit a portion of the index using one or more synchronization signals from among a primary synchronization signal, a secondary synchronization signal, and a tertiary synchronization signal and transmit a remaining portion of the index using the physical broadcast channel.

Advantageous Effect of the Invention

According to the present invention, it is possible to provide an SS block index to a user equipment apparatus while avoiding a shortage of a payload size of a PBCH and reducing a workload of the user equipment apparatus during initial access.

BRIEF DESCRIPTION OF THE DRAWINGS

FIG. 4 is a sequence diagram illustrating a communication procedure in a radio communication system according to an embodiment of the present invention.

FIG. 5A is a diagram illustrating a first exemplary structure (1-1) of SS blocks.

FIG. 5B is a diagram illustrating a first exemplary structure (1-2) of SS blocks.

FIG. 5C is a diagram illustrating a first exemplary provisioning scheme of an SS block.

FIG. 6B is a diagram illustrating a second exemplary structure (2-2) of SS blocks.

FIG. 6F is a diagram illustrating a second exemplary provisioning scheme of an SS block.

FIG. 7 is a block diagram illustrating a functional configuration of a base station according to an embodiment of the present invention.

FIG. 8 is a block diagram illustrating a functional configuration of a user equipment apparatus according to an embodiment of the present invention.

DETAILED DESCRIPTION OF THE PREFERRED EMBODIMENTS

Hereinafter, embodiments of the invention will be described with reference to the accompanying drawings. The embodiments described below are merely examples and embodiments of the invention are not limited to the following embodiments. While the embodiments are described using the terms defined in LTE, for example, the invention is not limited to LTE but can be also applied to another system. In the specification and the appended claims, "LTE" is used in a broad meaning including not only a communication system corresponding to Release 8 or 9 of 3GPP but also a communication system corresponding to Release 10, 11, 12, or 13 of 3GPP and a fifth-generation communication system corresponding to Release 14 or later of 3GPP.

System Configuration

Figure 1:
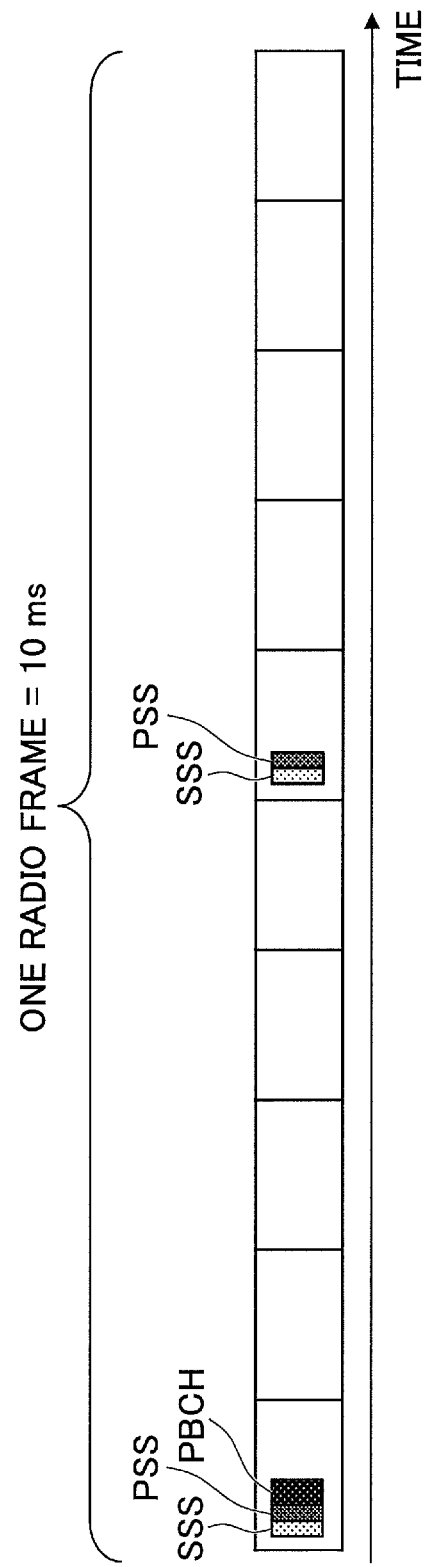
FIG. 1 is a diagram illustrating a frame structure for initial access in LTE.
Figure 2:
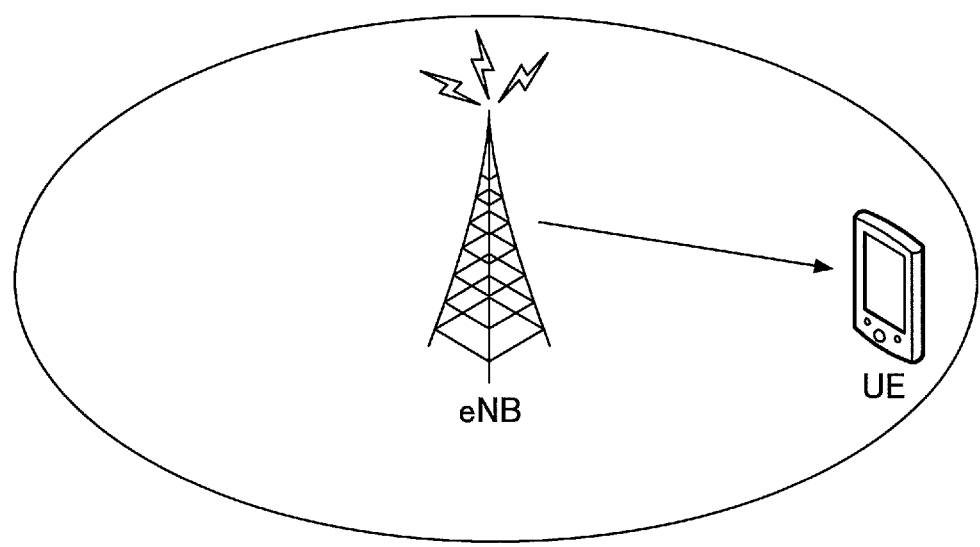
FIG. 2 is a diagram illustrating an exemplary configuration of a radio communication system according to an embodiment of the present invention.

FIG. 2 is a conceptual diagram of an exemplary configuration of a radio communication system according to an embodiment of the present invention. As illustrated in FIG. 2, the radio communication system according to the embodiment of the present invention includes a base station eNB and a user equipment apparatus UE. While a single base station eNB and a single user equipment apparatus UE are illustrated in FIG. 2, a plurality of base stations eNBs or a plurality of user equipment apparatuses UEs may be included.

The base station eNB can accommodate one or more (for example, three) cells (also referred to as "sectors"). When the base station eNB accommodates a plurality of cells, the entire coverage area of the base station eNB can be divided into a plurality of small areas, and in each small area, a communication service can be provided through a base station subsystem (for example, a small indoor base station remote radio head (RRH)). The term "cell" or "sector" refers to a part or whole of the coverage area in which the base station and/or the base station subsystem provides a communication service. Further, the terms "base station", "eNB", "cell", and "sector" can be used interchangeably in this specification. In some cases, the base station eNB is also referred to as a fixed station, a NodeB, an eNodeB (eNB), a gNodeB (gNB), an access point, a femto cell, a small cell, or the like.

In some cases, the user equipment apparatus UE is referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or any other suitable term by those skilled in the art.

Next, initial access between the user equipment apparatus and the base station is described below.

The user equipment apparatus needs to perform cell search in order to communicate with the base station. Signals used for cell search are referred to as synchronization signals (SSs), which include a primary synchronization signal (PSS) and a secondary synchronization signal (SSS). In addition, a newly-defined synchronization signal (hereinafter referred to as a "tertiary synchronization signal (TSS)") may be also used. A sequence for identifying a local ID is used for the PSS and a sequence for identifying a cell group ID is used for the SSS. A cell ID can be identified by a combination of the local ID and the cell group ID. In the embodiment of the present invention, the combination of the local ID and the cell group ID is used to identify a cell ID; however, another ID may be alternatively used. For example, a cell ID may be identified only by either the sequence used for the PSS or the sequence used for the SSS. Each of the sequences used for the PSS and the SSS may be formed by a Zadoff-Chu sequence or the like. Similarly, the sequence used for the TSS may be formed by a Zadoff-Chu sequence or the like.

Basic information which the user equipment apparatus UE should read after cell search is referred to as broadcast information, which includes a master information block (MIB) including a system bandwidth, a system frame number, and so on, and a system information block (SIB) including other kinds of system information. The MIB may be transmitted on a PBCH and the SIB may be transmitted on a physical downlink shared channel (PDSCH).

The PSS, the SSS, the TSS, and the PBCH are placed in an SS block at a predetermined resource location. In other words, an SS block is a resource including any of the PSS, the SSS, the TSS, and the PBCH. In the radio communication system according to the embodiment of the present invention, it is assumed that in addition to a single beam operation, a multi-beam operation is supported during initial access.

Figure 3A:
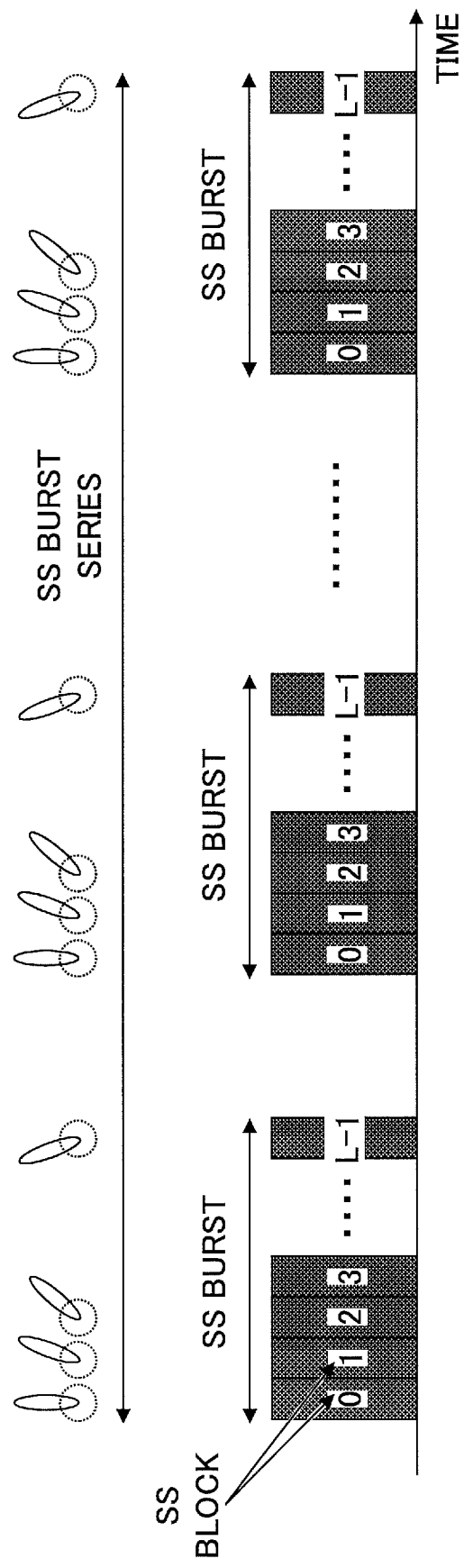
FIG. 3A is a diagram illustrating a first exemplary frame structure for initial access assuming that a multi-beam operation is supported.
Figure 3B:
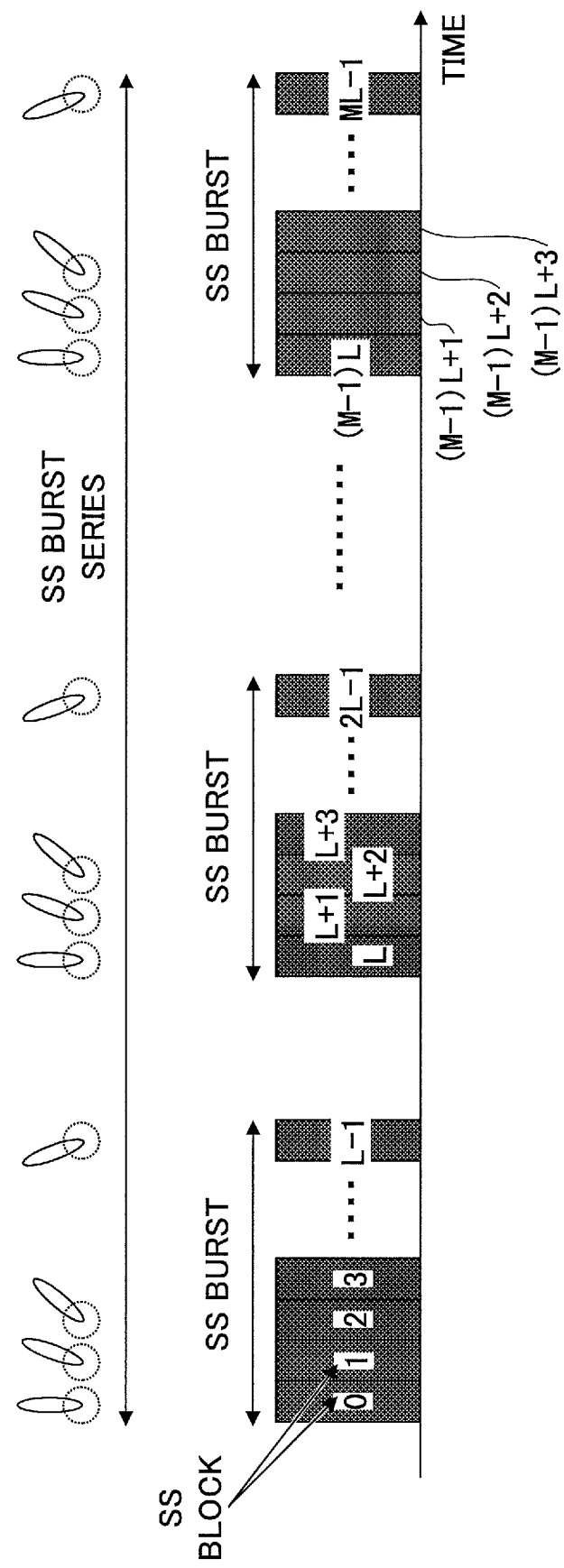
FIG. 3B is a diagram illustrating a second exemplary frame structure for initial access assuming that a multi-beam operation is supported.

FIGS. 3A and 3B are diagrams illustrating an exemplary frame structure for initial access assuming that a repetitive transmission is performed in the time domain. In these examples, it is assumed that a multi-beam operation is applied. When the multi-beam operation is applied, SS blocks are repeatedly placed in the time domain by changing a beam direction. It should be noted that SS blocks may be repeatedly placed in the time domain even if a single beam operation rather than the multi-beam operation is applied. A group of SS blocks continuously placed in the time domain is referred to as an "SS burst". The SS burst may be periodically or aperiodically transmitted.

An SS block index indicating a time-domain location of an SS block (for example, a location of the first symbol of the SS block in the SS burst) is assigned to the SS block. FIG. 3A illustrates an example where SS block indexes are assigned on a per-SS burst basis. For example, indexes starting from zero are sequentially assigned to L SS blocks in an SS burst, and then the same indexes starting from zero are also sequentially assigned to SS blocks in a next SS burst. FIG. 3B illustrates an example where an SS burst series that is a group of SS bursts are defined and SS block indexes are assigned on a per-SS burst series basis. For example, indexes starting from zero are sequentially assigned to L SS blocks in an SS burst, and then indexes starting from L are sequentially assigned to SS blocks in a next SS burst.

When an operation using an SS burst is supported, the user equipment apparatus may detect an SS block with an SS block index of zero or an SS block with an SS block index of one. In either of the frame structures of FIGS. 3A and 3B, the user equipment apparatus can use the SS block index to identify the time-domain location of the detected SS block within the radio frame.

Communication Procedure in Radio Communication System

Next, an example where a base station transmits a portion of an SS block index using one or more SSs of a PSS, an SSS, and a TSS, and transmits the remaining portion of the SS block index using a PBCH is described.

FIG. 4 is a sequence diagram illustrating a communication procedure in a radio communication system according to an embodiment of the present invention.

The base station generates an SS block index to be assigned to an SS block and, in the SS block, transmits at least one of a PSS, an SSS, and a TSS including a portion of the SS block index and transmits a PBCH including the remaining portion of the SS block index (S101). When the portion of the SS block index is included in the PSS or the SSS, a remaining sequence of the PSS or the SSS may be used. For example, nine hundred sixty-one sequences can be generated as an SSS in LTE; however, the SSS is used as a sequence to identify one of one hundred sixty-eight cell group IDs. In other words, for an SSS in LTE, (nine hundred sixty-one minus one hundred sixty-eight) remaining sequences are available. Similarly, for a PSS, remaining sequences are available. As a sequence indicating the portion of the SS block index, these remaining sequences may be used. Further, the fact that the remaining sequences are available for the PSS and the SSS means that resources for the PSS and the SSS are available. Within the available resources, a new sequence may be defined to indicate the portion of the SS block index.

When the portion of the SS block index is transmitted using the PSS, the sequence indicating the portion of the SS block index and a local ID for identifying a cell ID are multiplexed in the code domain, the frequency domain, or the time domain. Similarly, when the portion of the SS block index is transmitted using the SSS, the sequence indicating the portion of the SS block index and a cell group ID for identifying a cell ID are multiplexed in the code domain, the frequency domain, or the time domain. When the portion of the SS block index is transmitted using the TSS, a new sequence indicating the portion of the SS block index may be defined. The sequence indicating the portion of the SS block index may be transmitted using the PSS, the SSS, the TSS, or any combination thereof. The sequence indicating the remaining portion of the SS block index is transmitted using the PBCH.

For example, two hundred forty SS block indexes can be expressed as a first sequence which can represent twenty kinds of information and a second sequence which can represent twelve kinds of information. For example, the first sequence is transmitted using the PBCH and the second sequence is transmitted using one or more SSs of the PSS, the SSS, and the TSS. In other words, the second sequence may be included in the PSS, the SSS, or the TSS. Further, it is possible to express the second sequence as a combination of a third sequence which can represent two kinds of information and a fourth sequence which can represent six kinds of information, include the third sequence in one of the PSS, the SSS, and the TSS, and include the fourth sequence in another of the PSS, the SSS, and the TSS. It is also possible to express the second sequence as a combination of a fifth sequence which can represent two kinds of information, a sixth sequence which can represent two kinds of information, and a seventh sequence which can represent three kinds of information, and include the fifth sequence, the sixth sequence, and the seventh sequence in the PSS, the SSS, and the TSS, respectively.

The user equipment apparatus detects the portion of the SS block index included in one or more SSs of the PSS, the SSS, and the TSS at the time of detecting a cell ID using the PSS and the SSS. The user equipment apparatus also detects the remaining portion of the SS block index at the time of detecting the PBCH. The user equipment apparatus detects the SS block index by combining the portion of the SS block index included in one or more SSs of the PSS, the SSS, and the TSS and the remaining portion of the SS block index included in the PBCH (S103). As a result, the user equipment apparatus can use the SS block index to identify the time-domain location of the SS block within the radio frame.

Then, the user equipment apparatus can receive a SIB or the like and start random access (S105).

First Exemplary Provisioning Scheme of SS Block Index

FIGS. 5A-5C are diagrams illustrating first exemplary structures of SS blocks and first exemplary provisioning schemes of an SS block index. FIG. 5A illustrates an example (exemplary structure 1-1) where sets of SS blocks including PSSs, SSSs, or PBCHs are placed with a predetermined spacing in the time domain. FIG. 5B illustrates an example (exemplary structure 1-2) where a set of SS blocks including a PSS, an SSS, and a PBCH is continuously placed in the time domain. An example is described below with reference to the case (exemplary provisioning scheme 1-1 in FIG. 5C) where a sequence indicating a portion of an SS block index is included in an SSS.

It is assumed that a base station can transmit one or more SS blocks, and generate an SSS sequence to be transmitted in an SS block, including information for identifying a cell group ID and a sequence indicating a portion of an SS block index.

The user equipment apparatus can identify the information for identifying the cell group ID and the portion of the SS block index from an SSS sequence included in a detected SS block. Further, the user equipment apparatus can identify the remaining portion of the SS block index by decoding a PBCH.

The base station may scramble the sequence indicating the portion of the SS block index using the sequence for identifying the cell group ID. Correspondingly, the user equipment apparatus may detect the cell group ID, and then detect the portion of the SS block index. Alternatively, the base station may scramble the sequence for identifying the cell group ID using the sequence indicating the portion of the SS block index. Correspondingly, the user equipment apparatus may detect the portion of the SS block index, and then detect the cell group ID.

A similar procedure can be applied to the case (exemplary provisioning scheme 1-2 in FIG. 5C) where a sequence indicating a portion of an SS block index is included in a PSS. Further, a similar procedure can be also applied to the case (exemplary provisioning scheme 1-3 in FIG. 5C) where a sequence indicating a portion of an SS block index is included in both a PSS and an SSS.

Second Exemplary Provisioning Scheme of SS Block Index

Figure 6A:
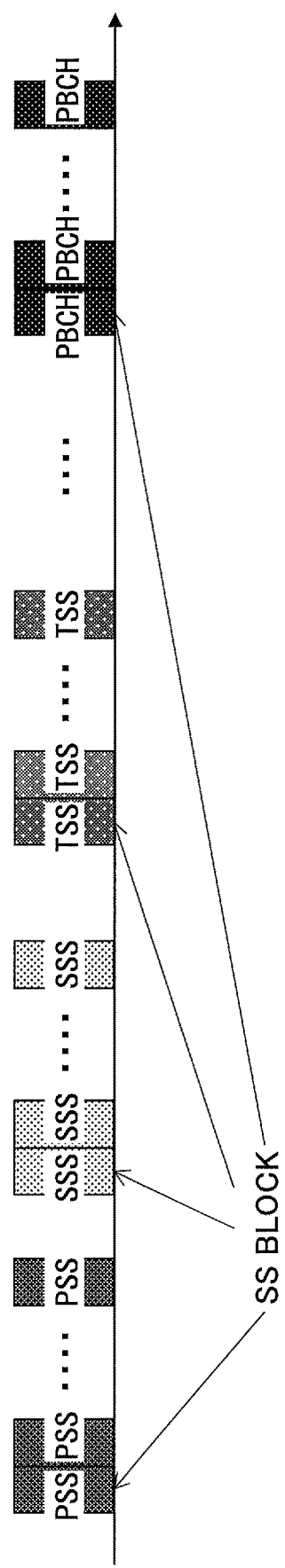
FIG. 6A is a diagram illustrating a second exemplary structure (2-1) of SS blocks.
Figure 6C:
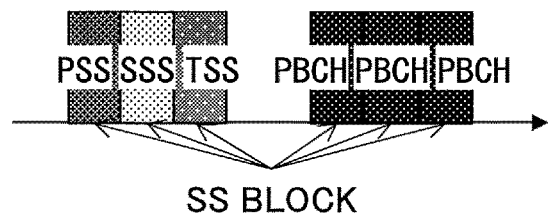
FIG. 6C is a diagram illustrating a second exemplary structure (2-3) of SS blocks.
Figure 6D:
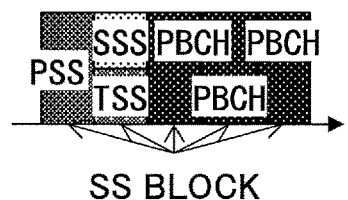
FIG. 6D is a diagram illustrating a second exemplary structure (2-4) of SS blocks.
Figure 6E:
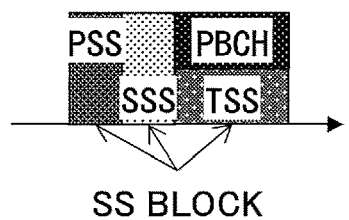
FIG. 6E is a diagram illustrating a second exemplary structure (2-5) of SS blocks.

FIGS. 6A-6F are diagrams illustrating second exemplary structures of SS blocks and second exemplary provisioning schemes of an SS block index. FIG. 6A illustrates an example (exemplary structure 2-1) where sets of SS blocks including PSSs, SSSs, TSSs, or PBCHs are placed with a predetermined spacing in the time domain. FIG. 6B illustrates an example (exemplary structure 2-2) where a set of SS blocks including a PSS, an SSS, a TSS, and a PBCH is continuously placed in the time domain. FIG. 6C illustrates an example (exemplary structure 2-3) where sets of SS blocks are placed with a predetermined spacing in the time domain and a set of SS blocks is continuously placed in the time domain. FIGS. 6D and 6E illustrate examples (exemplary structures 2-4 and 2-5) where frequency multiplexing is used in part of a PSS/SSS/TSS/PBCH. An example is described below with reference to the case (exemplary provisioning scheme 2-1 in FIG. 6F) where a sequence indicating a portion of an SS block index is included in a TSS.

It is assumed that a base station can transmit one or more SS blocks, and generate a TSS sequence to be transmitted in an SS block, including a sequence indicating a portion of an SS block index.

The user equipment apparatus can identify the portion of the SS block index from a TSS sequence included in a detected SS block. Further, the user equipment apparatus can identify the remaining portion of the SS block index by decoding a PBCH.

The base station may scramble the sequence indicating the portion of the SS block index using the sequence for identifying a local ID or a cell group ID. Correspondingly, the user equipment apparatus may detect the local ID or the cell group ID, and then detect the portion of the SS block index. Alternatively, the base station may scramble the sequence for identifying the local ID or the cell group ID using the sequence indicating the portion of the SS block index. Correspondingly, the user equipment apparatus may detect the portion of the SS block index, and then detect the local ID or the cell group ID.

A similar procedure can be applied to the case (exemplary provisioning scheme 2-2 in FIG. 6F) where a sequence indicating a portion of an SS block index is included in both a PSS and a TSS. Further, a similar procedure can be also applied to the case (exemplary provisioning scheme 2-3 in FIG. 6F) where a sequence indicating a portion of an SS block index is included in both an SSS and a TSS. Further, a similar procedure can be also applied to the case (exemplary provisioning scheme 2-4 in FIG. 6F) where a sequence indicating a portion of an SS block index is included in a PSS, an SSS, and a TSS.

It should be noted that an exemplary structure of a PSS, an SSS, a TSS, and a PBCH for providing an SS block index is not limited to FIGS. 5A-5B and 6A-6E, clearly, the PSS, the SSS, the TSS, and the PBCH may be placed anywhere in one or more SS blocks.

Configuration of Base Station

FIG. 7 is a block diagram illustrating a functional configuration of a base station 10 according to an embodiment of the present invention. The base station 10 includes an SS block index generation unit 101, a PSS sequence generation unit 103, an SSS sequence generation unit 105, a TSS sequence generation unit 107, a PBCH generation unit 109, and a transmission unit 111. The names of these functional units in FIG. 7 are merely examples, and these functional units may be differently termed. For example, when a portion of an SS block index is transmitted using a PSS and a remaining portion of the SS block index is transmitted using a PBCH, the SS block index generation unit 101, the PSS sequence generation unit 103, and the PBCH generation unit 109 may be collectively referred to as an SS block index generation unit.

The SS block index generation unit 101 generates an SS block index to be assigned to an SS block.

The PSS sequence generation unit 103 combines a sequence indicating a portion of an SS block index and a sequence for identifying a local ID to generate a PSS sequence, when the portion of the SS block index is transmitted using a PSS.

The SSS sequence generation unit 105 combines a sequence indicating a portion of an SS block index with a sequence for identifying a cell group ID to generate an SSS sequence, when the portion of the SS block index is transmitted using an SSS.

The TSS sequence generation unit 107 generates a TSS sequence indicating a portion of an SS block index, when the portion of the SS block index is transmitted using a TSS. When a TSS is not used, the TSS sequence generation unit 107 need not be included in the base station 10.

The PBCH generation unit 109 generates a sequence indicating a remaining portion of the SS block index and inputs the sequence to a payload of a PBCH.

The transmission unit 111 transmits the generated PSS sequence, the generated SSS sequence, the generated TSS sequence, the PBCH, or any combination thereof in the SS block.

Configuration of User Equipment Apparatus

FIG. 8 is a block diagram illustrating a functional configuration of a user equipment apparatus 20 according to an embodiment of the present invention. The user equipment apparatus 20 includes a reception unit 201, a PSS sequence estimation unit 203, an SSS sequence estimation unit 205, a TSS sequence estimation unit 207, a PBCH reception processing unit 209, and an SS block index estimation unit 211. The names of these functional units in FIG. 8 are merely examples, and these functional units may be differently termed.

The reception unit 201 receives a signal transmitted from a base station.

The PSS sequence estimation unit 203 detects reception timing of a PSS based on the signal received by the reception unit 201. The PSS sequence estimation unit 203 detects a local ID, and also detects a portion of an SS block index when the portion of the SS block index is included in a PSS sequence.

The SSS sequence estimation unit 205 detects a cell group ID based on the signal received by the reception unit 201, and also detects a portion of an SS block index when the portion of the SS block index is included in an SSS sequence.

The TSS sequence estimation unit 207 detects a portion of an SS block index when the portion of the SS block index is included in a TSS sequence. When a TSS is not used, the TSS sequence estimation unit 207 need not be included in the user equipment apparatus 20.

The PBCH reception processing unit 209 decodes a PBCH of a carrier corresponding to the cell ID identified by a combination of the local ID and the cell group ID. Then, the PBCH reception processing unit 209 detects a remaining portion of the SS block index.

The SS block index estimation unit 211 estimates the SS block index by combining the portion of the SS block index detected by the PSS sequence estimation unit 203, the SSS sequence estimation unit 205, or the TSS sequence estimation unit 207 and the remaining portion of the SS block index detected by the PBCH reception processing unit 209.

Hardware Configuration

The block diagrams used to describe the above-mentioned embodiment illustrate blocks of functional units. The functional blocks (components) are implemented by an arbitrary combination of hardware and/or software. A means for implementing each functional block is not particularly limited. That is, each functional block may be implemented by one apparatus in which a plurality of elements are physically and/or logically coupled or by a plurality of apparatuses that are physically and/or logically separated from each other and are connected directly and/or indirectly (for example, in a wired manner and/or wirelessly).

Figure 9:
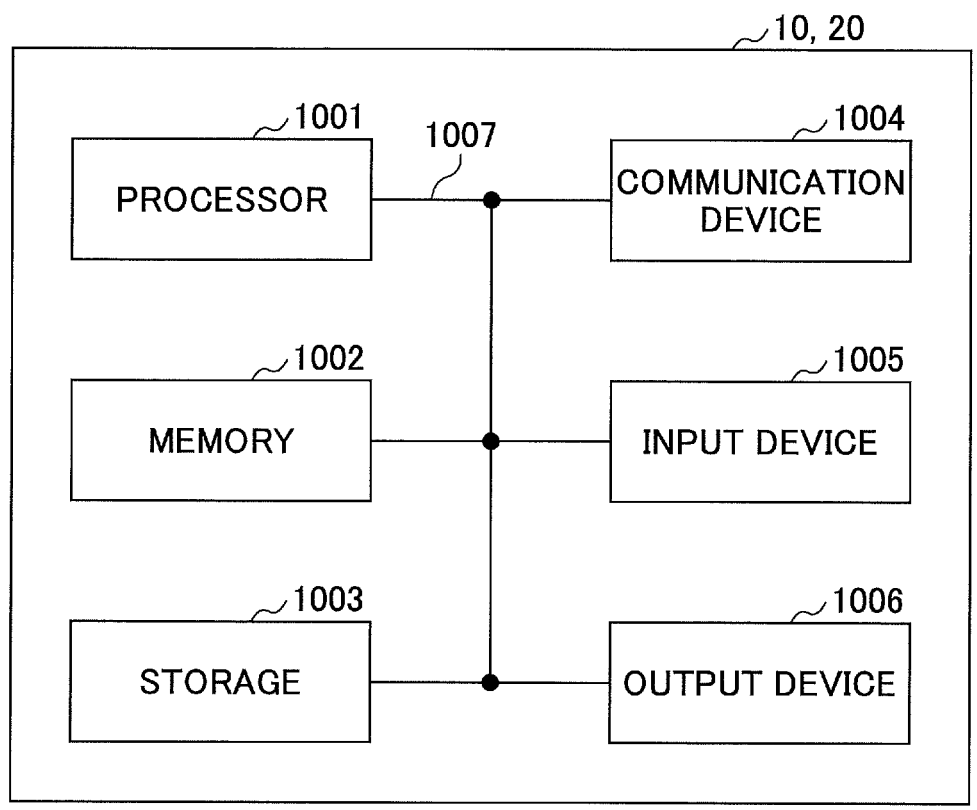
FIG. 9 is an exemplary hardware configuration of a base station or a user equipment apparatus according to an embodiment of the present invention.

For example, the base station 10, the user equipment apparatus 20, or the like according to the embodiment of the invention may function as a computer that performs a synchronization signal transmission method according to this embodiment. FIG. 9 is a diagram illustrating an example of a hardware configuration of the base station 10 or the user equipment apparatus 20 according to this embodiment. Each of the base station 10 and the user equipment apparatus 20 may be physically configured as a computer device including, for example, a processor 1001, a memory 1002, a storage 1003, a communication device 1004, an input device 1005, an output device 1006, and a bus 1007.

In the following description, the term "device" can be substituted with, for example, a circuit, an apparatus, or a unit. The hardware configuration of the base station 10 or the user equipment apparatus 20 may include one or a plurality of devices illustrated in FIG. 9 or may not include some of the devices.

Each function of the base station 10 and the user equipment apparatus 20 may be implemented by the following process: predetermined software (program) is read onto hardware such as the processor 1001 or the memory 1002, and the processor 1001 performs an operation to control the communication of the communication device 1004 and the reading and/or writing of data from and/or to the memory 1002 and the storage 1003.

The processor 1001 operates, for example, an operating system to control the overall operation of the computer. The processor 1001 may be a central processing unit (CPU) including, for example, an interface with peripheral devices, a control device, an arithmetic device, and a register. For example, the SS block index generation unit 101, the PSS sequence generation unit 103, the SSS sequence generation unit 105, the TSS sequence generation unit 107, the PBCH generation unit 109, the PSS sequence estimation unit 203, the SSS sequence estimation unit 205, the TSS sequence estimation unit 207, the PBCH reception processing unit 209, the SS block index estimation unit 211, and so on may be implemented in the processor 1001.

The processor 1001 reads a program (program code), a software module, and/or data from the storage 1003 and/or the communication device 1004 to the memory 1002 and performs various types of processes according to the program, the software module, or the data. A program that causes a computer to perform at least some of the operations described in the embodiment may be used. For example, the SS block index generation unit 101 in the base station 10 may be implemented by a control program that is stored in the memory 1002 and is executed by the processor 1001. The other functional blocks may be similarly implemented. In the embodiment, the above-mentioned various processes are performed by one processor 1001. However, the processes may be simultaneously or sequentially performed by two or more processors 1001. The processor 1001 may be mounted on one or more chips. The program may be transmitted over the network through a telecommunication line.

The memory 1002 is a computer-readable recording medium and may include, for example, at least one of a read only memory (ROM), an erasable programmable ROM (EPROM), an electrically erasable programmable ROM (EEPROM), and a random access memory (RAM). The memory 1002 may be also referred to as, for example, a register, a cache, or a main memory (main storage device). The memory 1002 can store, for example, an executable program (program code) and a software module that can perform a synchronization signal transmission method according to the embodiment of the invention.

The storage 1003 is a computer-readable recording medium and may include, for example, at least one of an optical disk such as a compact disc ROM (CD-ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, and a magnetic strip. The storage 1003 may be also referred to as an auxiliary storage device. The above-mentioned storage medium may be, for example, a database, a server, and other suitable media including the memory 1002 and/or the storage 1003.

The communication device 1004 is hardware (a transmission and reception device) for communicating with a computer through a wired and/or wireless network and is also referred to as, for example, a network device, a network controller, a network card, or a communication module. For example, the transmission unit 111, the reception unit 201, and the like may be implemented by the communication device 1004.

The input device 1005 is an input unit (for example, a keyboard, a mouse, a microphone, a switch, a button, or a sensor) that receives an input from the outside. The output device 1006 is an output unit (for example, a display, a speaker, or an LED lamp) that performs an output process to the outside. The input device 1005 and the output device 1006 may be integrated into a single device (for example, a touch panel).

Devices such as the processor 1001 and/or the memory 1002 are connected to each other via the bus 1007 for information communication. The bus 1007 may be a single bus or the devices may be connected to each other by different buses.

Each of the base station 10 and the user equipment apparatus 20 may include hardware such as a microprocessor, a digital signal processor (DSP), an application specific integrated circuit (ASIC), a programmable logic device (PLD), and a field programmable gate array (FPGA). Some or all of the functional blocks may be implemented by the hardware. For example, the processor 1001 may be implemented by at least one of these hardware components.

Effects of Embodiments

According to an embodiment of the present invention, it is possible to provide an SS block index to a user equipment apparatus while avoiding a shortage of a payload size of a PBCH and reducing a workload of the user equipment apparatus during initial access. Specifically, since the SS block index is transmitted using a PSS, an SSS, or a TSS in addition to the PBCH, a shortage of the payload size of the PBCH can be avoided. Further, since only a portion of the SS block index is transmitted using the PSS, the SSS, or the TSS, the range of the sequence to be detected by the user equipment apparatus can be limited, and consequently a workload of the user equipment apparatus during initial access can be reduced. It should be noted that the TSS may not be needed because the TSS occupies additional resources. Even if the TSS is used, according to an embodiment of the present invention, the number of resources for the TSS can be reduced. In this manner, the workload of the user equipment apparatus to detect SSs and the amount of information to be transmitted on the PBCH can be optimized.

Further, when a PSS, an SSS, a TSS, and a PBCH are multiplexed in an SS burst as illustrated in FIGS. 5B and 6B-6D, a user equipment apparatus which can decode the PBCH in an SS burst at an early stage in a SS burst series can immediately proceed with SIB reception or the like.

Supplementary Explanation

Each aspect/embodiment described in the specification may be applied to systems using Long Term Evolution (LTE), LTE-Advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-WideBand (UWB), Bluetooth (registered trademark), and other suitable systems and/or next-generation systems that have functionality enhanced based on these systems.

The terms "system" and "network" used in the specification are interchangeably used.

In the specification, a specific operation performed by the base station may be performed by an upper node of the base station. In a network having one or a plurality of network nodes including the base station, it is clearly understood that various operations performed for communication with the user equipment apparatus can be performed by the base station and/or a network node (for example, including an MME or an S-GW without limitation) other than the base station. The number of network nodes other than the base station is not limited to one, and a plurality of other network nodes (for example, an MME and an S-GW) may be combined with each other.

Information or the like can be output from a higher layer (or a lower layer) to a lower layer (or a higher layer). Information or the like may be input or output via a plurality of network nodes.

The input or output information or the like may be stored in a specific location (for example, a memory) or may be managed in a management table. The input or output information or the like may be overwritten, updated, or edited. The output information or the like may be deleted. The input information or the like may be transmitted to another apparatus.

The transmission of information is not limited to the aspects/embodiments described in the specification and may be performed by other means. For example, the transmission of information may be performed by physical layer signaling (for example, downlink control information (DCI) or uplink control information (UCI)), higher layer signaling (for example, radio resource control (RRC) signaling, medium access control (MAC) signaling, or broadcast information (a master information block (MIB) and a system information block (SIB))), another signal, or a combination thereof. The RRC signaling may be also referred to as an RRC message and may be, for example, an RRC connection setup message or an RRC connection reconfiguration message.

Determination may be made based on a value (0 or 1) represented by 1 bit, may be made based on a true or false value (boolean: true or false), or may be made based on comparison with a numerical value (for example, comparison with a predetermined value).

Regardless of the fact that software is referred to as software, firmware, middleware, a microcode, a hardware description language, or another name, the software is broadly interpreted to include an instruction, an instruction set, a code, a code segment, a program code, a program, a sub-program, a software module, an application, a software application, a software package, a routine, a subroutine, an object, an executable file, an execution thread, a procedure, a function, or the like.

Software, an instruction, or the like may be transmitted or received via a transmission medium. For example, when software is transmitted from a website, a server, or another remote source using a wired technology such as a coaxial cable, an optical cable, a twisted pair, and a digital subscriber line (DSL) and/or a wireless technology such as an infrared ray, radio, and microwaves, the wired technology and/or the wireless technology is included in the definition of a transmission medium.

The information, the signal, and the like described in the specification may be represented using any of various technologies. For example, the data, the instruction, the command, the information, the signal, the bit, the symbol, the chip, and the like mentioned throughout the description may be represented by a voltage, a current, an electromagnetic wave, a magnetic field, or a magnetic particle, an optical field or a photon, or any combination thereof.

The terms described in the specification and/or terms necessary to understand the specification may be replaced with terms that have same or similar meanings. For example, a channel and/or a symbol may be a signal. A signal may be a message. A component carrier (CC) may be referred to as a carrier frequency, a cell, or the like.

The information, the parameter, or the like described in the specification may be represented by an absolute value, may be represented by a relative value from a predetermined value, or may be represented by another piece of corresponding information. For example, a radio resource may be indicated using an index.

The names used for the above-described parameters are not limited in any respect. Further, a numerical expression or the like in which the parameters are used can be different from the numerical expression disclosed explicitly in the specification. Since various channels (for example, a PUCCH and a PDCCH) and information elements (for example, TPC) can be identified with any suitable names, various names allocated to the various channels and the information elements are not limited in any respect.

The terms "determining" and "deciding" used in the specification include various operations.

The terms "determining" and "deciding" can include, for example, "determination" and "decision" for calculating, computing, processing, deriving, investigating, looking-up (for example, looking-up in a table, a database, or another data structure), and ascertaining operations. In addition, the terms "determining" and "deciding" can include "determination" and "decision" for receiving (for example, information reception), transmitting (for example, information transmission), input, output, and accessing (for example, accessing data in a memory) operations. The terms "determining" and "deciding" can include "determination" and "decision" for resolving, selecting, choosing, establishing, and comparing operations. That is, the terms "determining" and "deciding" can include "determination" and "decision" for any operation.

The term "based on" used in the specification does not mean "only based on" unless otherwise stated. In other words, the term "based on" means both "only based on" and "at least based on".

When reference is made to elements in which terms "first," "second," and the like are used in the specification, the number or the order of the elements is not generally limited. These terms can be used in the specification as a method to conveniently distinguish two or more elements from each other. Accordingly, reference to first and second elements does not imply that only two elements are employed or the first element is prior to the second element in some ways.

The terms "include" and "including" and the modifications thereof are intended to be inclusive, similarly to the term "comprising", as long as they are used in the specification or the claims. In addition, the term "or" used in the specification or the claims does not mean exclusive OR.

In each aspect/embodiment described in the specification, for example, the order of the processes in the procedure, the sequence, and the flowchart may be changed unless a contradiction arises. For example, for the method described in the specification, elements of various steps are presented in the exemplified order. However, the invention is not limited to the presented specific order.

The aspects/embodiments described in the specification may be individually used, may be combined, or may be switched during execution. In addition, transmission of predetermined information (for example, transmission of "being X") is not limited to being performed explicitly, but may be performed implicitly (for example, the transmission of the predetermined information is not performed).

The invention has been described in detail above. It will be apparent to those skilled in the art that the invention is not limited to the embodiments described in the specification. Various modifications and changes can be made, without departing from the scope and spirit of the invention described in the claims. Therefore, the embodiments described in the specification are illustrative and do not limit the invention.

The present international application is based on and claims the benefit of priority of Japanese Patent Application No. 2017-019141 filed on Feb. 3, 2017, the entire contents of which are hereby incorporated by reference.

DESCRIPTION OF NOTATIONS 10 base station
101 SS block index generation unit
103 PSS sequence generation unit
105 SSS sequence generation unit
107 TSS sequence generation unit
109 PBCH generation unit
111 transmission unit
20 user equipment apparatus
201 reception unit
203 PSS sequence estimation unit
205 SSS sequence estimation unit
207 TSS sequence estimation unit
209 PBCH reception processing unit
211 SS block index estimation unit
1001 processor
1002 memory
1003 storage
1004 communication device
1005 input device
1006 output device
1007 bus

The invention claimed is:

1. A terminal comprising:
a receiver that receives a known sequence and broadcast information in a synchronization signal block, wherein the synchronization signal block comprises a synchronization signal and a physical broadcast channel; and
a processor, wherein
a synchronization signal block index comprises a portion and a remaining portion, the processor determines the portion of the synchronization signal block index based on the known sequence and determines the remaining portion of the synchronization signal block index based on the broadcast information,
the synchronization signal block index indicates a location of the synchronization signal block in time domain, and
wherein the portion of the synchronization signal block index is received using a signal in the synchronization signal block, the signal being not included in the physical broadcast channel, and the remaining portion of the synchronization signal block index is received using the physical broadcast channel.

2. The terminal as claimed in claim 1, wherein the known sequence is one of a plurality of sequences transmitted in the synchronization signal block.

3. The terminal as claimed in claim 1, wherein the processor synchronizes with a base station using the known sequence.

4. A base station comprising:
a processor that establishes a portion of a synchronization signal block index in broadcast information, wherein the synchronization signal block comprises a synchronization signal and a physical broadcast channel, wherein the synchronization signal block index comprises the portion and a remaining portion; and
a transmitter that transmits a known sequence and the broadcast information in the synchronization signal block,
wherein the synchronization signal block index indicates a location of the synchronization signal block in time domain,
wherein the known sequence is used to determine the remaining portion of the synchronization signal block index, and
wherein the portion of the synchronization signal block index is transmitted using a signal in the synchronization signal block, the signal being not included in the physical broadcast channel, and the remaining portion of the synchronization signal block index is transmitted using the physical broadcast channel.

5. The terminal as claimed in claim 2, wherein the processor synchronizes with a base station using the known sequence.

6. A radio communication method for a terminal, comprising:

receiving a known sequence and broadcast information in a synchronization signal block, wherein the synchronization signal block comprises a synchronization signal and a physical broadcast channel, wherein a synchronization signal block index comprises a portion and a remaining portion, the radio communication method further comprises:

determining the portion of the synchronization signal block index based on the known sequence and determining the remaining portion of the synchronization signal block index based on the broadcast information, and the synchronization signal block index indicates a location of the synchronization signal block in time domain, wherein the portion of the synchronization signal block index is received using a signal in the synchronization signal block, the signal being not included in the physical broadcast channel, and the remaining portion of the synchronization signal block index is received using the physical broadcast channel.

7. A system comprising:
a terminal that comprises:
a receiver that receives a known sequence and broadcast information in a synchronization signal block, wherein the synchronization signal block comprises a synchronization signal and a physical broadcast channel; and a first processor, wherein a synchronization signal block index comprises a portion and a remaining portion, the first processor determines the portion of the synchronization signal block index based on the known sequence and determines the remaining portion of the synchronization signal block index based on the broadcast information, and wherein the portion of the synchronization signal block index is received using a signal in the synchronization signal block, the signal being not included in the physical broadcast channel, and the remaining portion of the synchronization signal block index is received using the physical broadcast channel; and a base station that comprises:

a second processor that establishes the remaining portion of the synchronization signal block index in broadcast information; and a transmitter that transmits the known sequence and the broadcast information in the synchronization signal block, wherein the synchronization signal block index indicates a location of the synchronization signal block in time domain.

8. The terminal as claimed in claim 1, wherein the portion of the synchronization signal block index is received using the synchronization signal.

* * * * *